(12) United States Patent
Brenner et al.

(10) Patent No.: US 8,635,002 B2
(45) Date of Patent: Jan. 21, 2014

(54) CONTROL METHOD FOR A COUPLING IN THE POWERTRAIN OF A MOTOR VEHICLE

(75) Inventors: Christoph Brenner, Steyr (AT); Gerhard Frühwirth, Schönau (AT)

(73) Assignee: Engineering Center Steyr GmbH & Co KG, St. Valentin (AT)

( * ) Notice: Subject to any disclaimer, the term of this patent is extended or adjusted under 35 U.S.C. 154(b) by 40 days.

(21) Appl. No.: 13/405,410

(22) Filed: Feb. 27, 2012

(65) Prior Publication Data

US 2012/0221221 A1     Aug. 30, 2012

(30) Foreign Application Priority Data

Feb. 28, 2011   (DE) .......................... 10 2011 012 593

(51) Int. Cl.
*B60K 28/16* (2006.01)

(52) U.S. Cl.
USPC ............................................ 701/88; 180/197

(58) Field of Classification Search
USPC .................. 701/88–90, 70, 69; 180/197, 239, 180/247–250
See application file for complete search history.

(56) References Cited

U.S. PATENT DOCUMENTS

| | | | |
|---|---|---|---|
| 4,681,185 A | 7/1987 | Hoernig et al. | |
| 4,792,011 A | 12/1988 | Stelter et al. | |
| 4,874,059 A | 10/1989 | Kasegawa | |
| 4,961,476 A | 10/1990 | Witte et al. | |
| 5,168,953 A | 12/1992 | Naito | |
| 5,335,764 A | 8/1994 | Leitner et al. | |
| 5,366,041 A | 11/1994 | Shiraishi et al. | |
| 5,524,738 A | 6/1996 | Erlebach et al. | |
| 5,570,755 A | 11/1996 | Fruhwirth et al. | |
| 5,676,219 A | 10/1997 | Fruhwirth et al. | |
| 6,009,969 A | 1/2000 | Salcher et al. | |
| 6,038,506 A * | 3/2000 | Diekhans et al. | 701/88 |
| 6,071,207 A | 6/2000 | Stephens et al. | |
| 6,487,486 B1 | 11/2002 | Anderson | |
| 6,755,763 B1 | 6/2004 | Goto et al. | |

(Continued)

FOREIGN PATENT DOCUMENTS

| | | |
|---|---|---|
| DE | 3040120 C2 | 6/1983 |
| DE | 3505455 A1 | 8/1986 |

(Continued)

OTHER PUBLICATIONS

European Search Report for European Patent Application No. 12001268.7, dated Aug. 2, 2012, and English translation thereof.

(Continued)

*Primary Examiner* — Mary Cheung
*Assistant Examiner* — Rodney Butler

(57) ABSTRACT

A method of controlling at least one coupling in a powertrain of a motor vehicle includes the steps of: determining at least one slip value which represents an instantaneous slip between different axles of the motor vehicle or between different wheels of an axle; forming an absolute value of the slip value which corresponds to the amount of the slip value; summing the absolute value or a substitute value derived therefrom to a last-formed slip sum value to form an instantaneous slip sum value; comparing the instantaneous slip sum value with a slip sum threshold value; and generating a control signal for actuating the coupling if the instantaneous slip sum value reaches or exceeds the slip sum threshold value.

29 Claims, 3 Drawing Sheets

(56) References Cited

U.S. PATENT DOCUMENTS

| | | |
|---|---|---|
| 7,016,778 B1 | 3/2006 | Ehmer et al. |
| 7,873,457 B2 | 1/2011 | Christofl et al. |
| 2010/0252348 A1 | 10/2010 | Ueda et al. |

FOREIGN PATENT DOCUMENTS

| | | |
|---|---|---|
| DE | 3821080 A1 | 1/1989 |
| DE | 3811214 A1 | 10/1989 |
| DE | 4113128 A1 | 10/1992 |
| DE | 4221045 A1 | 1/1993 |
| DE | 4427040 A1 | 2/1996 |
| DE | 4327507 C2 | 7/1996 |
| DE | 19749919 A1 | 6/1998 |
| DE | 4112906 C2 | 5/2002 |
| EP | 0233587 A2 | 8/1987 |
| EP | 0401095 A1 | 12/1990 |
| EP | 0644077 A1 | 3/1995 |
| EP | 1340644 A2 | 9/2003 |
| EP | 1354748 A1 | 10/2003 |
| EP | 1468860 A2 | 10/2004 |
| GB | 2378688 B | 4/2005 |
| JP | H0811565 A * | 1/1996 |

OTHER PUBLICATIONS

German Search Report for German Patent Application No. 10 2011 012 593.0, dated Oct. 14, 2011, and English translation thereof.

* cited by examiner

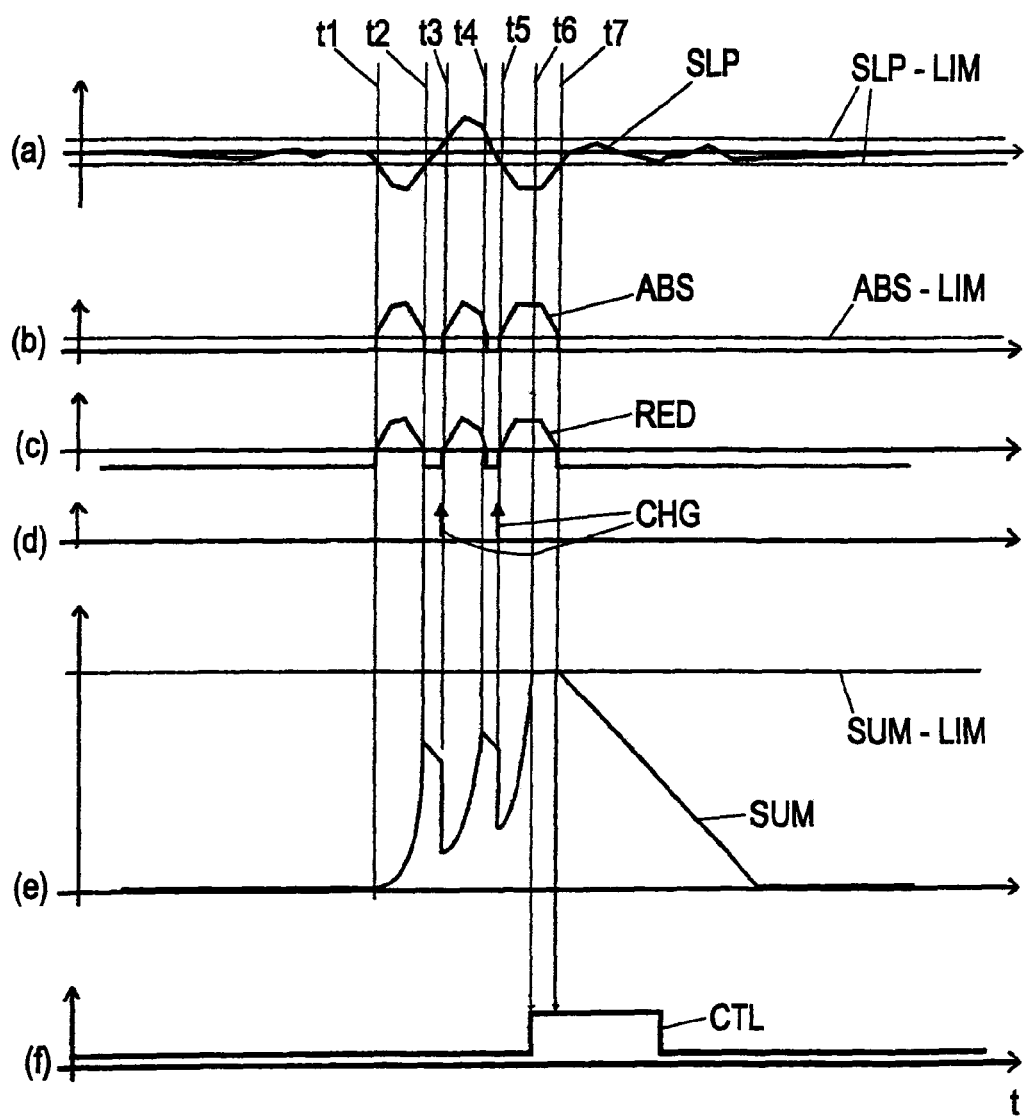

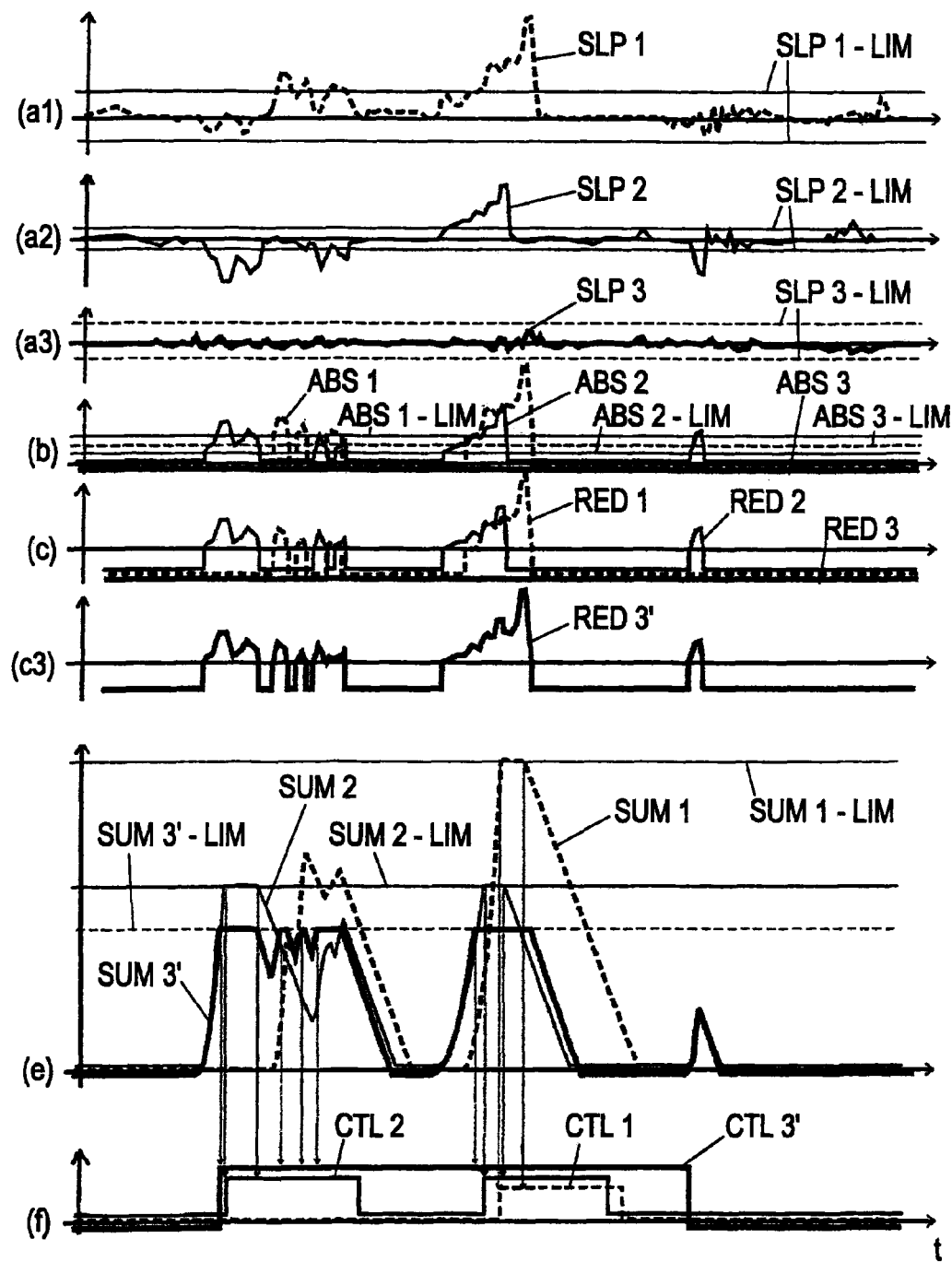

CONTROL METHOD FOR A COUPLING IN THE POWERTRAIN OF A MOTOR VEHICLE

CROSS-REFERENCE TO RELATED APPLICATIONS

This application claims the benefit and priority of German Patent Application No. 10 2011 012 593.0 filed Feb. 28, 2011. The disclosure of the above application is incorporated herein in its entirety.

FIELD

The invention relates to a method of controlling at least one coupling in a powertrain of a motor vehicle. The method can in particular serve for controlling at least one coupling operative in form-fitting manner of a differential lock of an off-road vehicle.

BACKGROUND

The statements in this section merely provide background information related to the present invention and may not necessarily constitute prior art.

In a motor vehicle, a coupling in the powertrain serves for changing the transfer distribution of the driving torque to the different axles of the motor vehicle and/or to the different wheels of a respective axle. Sufficient traction should hereby be ensured in all imaginable driving situations, in particular when driving off-road. The respective coupling is associated with a transfer case for this purpose, for example. The transfer case can be operative in the longitudinal direction of the vehicle, i.e. between different axles. The powertrain can, for example, have an inter-axle differential gear which distributes the driving torque permanently onto the two associated axles and which is selectively locked by means of the coupling (so-called longitudinal differential lock). Alternatively to this, it can be a case of a transfer case of the "torque-on-demand" type in which a primary axle is constantly driven and a secondary axle is selectively activated, i.e. additionally driven, by means of the coupling. The coupling can also be associated with an axle differential gear which is operative in the transverse direction, which distributes the driving torque to the wheels of the respective axle and which is selectively locked by means of the coupling (so-called transverse differential lock or axle differential lock). Finally, the coupling can also be associated with a wheel drive of the powertrain which can be activated, i.e. the driving torque can selectively be transferred to a single wheel by means of the coupling.

The motor vehicle can have two or more axles and accordingly a plurality of couplings of the named kind can be provided, for example one or more longitudinal differential locks and two or more transverse differential locks. If the actuation of a plurality of couplings in the powertrain should take place in an automated manner as much as possible, the control of the couplings becomes very complex.

Special demands have to be made in this respect if it is an off-road vehicle, in particular an off-road vehicle having more than two axles. It is particularly important in an off-road vehicle that a loss of traction is avoided at an early time and effectively since it can otherwise be very difficult in unfavorable driving situations to return to a stable driving situation (for example with a small or greatly varying coefficient of friction of the ground, of a slope and/or of a side position). Whereas the respective coupling can generally be made as a multi-disk coupling operative with friction engagement, with all-terrain vehicles form-fitting couplings, i.e. dog couplings, are typically used to be able to transfer high torques with low wear.

The actuation of the respective coupling takes place as a consequence of a corresponding control by means of a suitable actuator, for example pneumatically, hydraulically, electromechanically or electromagnetically. To produce a corresponding control signal for the respective coupling, slip values can be determined and evaluated which represent an instantaneous slip between different axles of the motor vehicle or between different wheels of an axle. It is therefore in the widest sense a case of speed of rotation differences or speed differences, for example, the speed of rotation difference between the two output shafts of a differential gear or the difference between the wheel speed signals of an axle. For example, the respective slip value or a value derived herefrom can be compared with a suitable threshold value to generate a control signal for actuating the coupling in the case of an exceeding of the threshold value.

Provided the determined slip values are compared directly with a threshold value, there is, however, the risk of too early a shift of the coupling, for example when a comparatively large slip should only be detected for a short period, but which can also result only from the elasticity of the powertrain. To avoid this problem, it is possible to add the determined speed of rotation differences to form slip sum values which are compared with a slip sum threshold value. Such a process is known from the document EP 0 644 077 B1 in which the control of the coupling should take place very fast in the event of a rapidly increasing speed of rotation difference, but only after a longer period with a small speed of rotation difference. An evaluation independent of the sign should take place by the formation of slip sums here in the event of changing slip (leading slip and trailing slip) to avoid unnecessary shifts. This document also teaches providing a hierarchical structure for a plurality of couplings of a powertrain, with couplings lower in the hierarchy also outputting control signals for couplings higher in the hierarchy. A disadvantage of the process described in the document EP 0 644 077 B1 is that slip oscillations, i.e. repeated variations in the sign of the slip occurring within a limited time window are not sufficiently taken into account. In addition, the required calculation steps are undesirably complex.

In the document EP 1 468 860 B1 an addition of slip values also takes place up to the reaching of a predefined threshold value, with the taking into account of leading slip and trailing slip being carried out separately, i.e. the calculations and evaluations are carried out separately for the different signs of the determined slip values. A disadvantage of this process is in turn the complex manner of calculation since the calculations have to be carried out twice in principle, namely both for leading slip and for trailing slip. An evaluation of the determined slip values which is as fast as possible and a corresponding generation of control signals is, however, of great importance particularly with couplings operative in form-fitting manner in the powertrain of an off-road vehicle since otherwise speed of rotation differences arise which make it impossible to close the respective coupling in time.

SUMMARY

It is an object of the invention to provide a control method of the above-explained kind in which the required calculations and evaluations can be carried out fast and with simple means to be able to generate the control signals for the respective coupling as quickly as possible on use of an inexpensive control device, in particular before the closing of a coupling operative in a form-fitting manner is no longer possible at all due to the speed of rotation differences which arise. In particular the taking into account of slip oscillations should also be possible. Furthermore a powertrain of a motor vehicle should be provided which has at least one coupling and one control device for controlling the coupling.

This object is satisfied by a method of controlling at least one coupling in a powertrain of a motor vehicle in which at least the following steps are carried out in a respective calculation loop:

determining at least one slip value which represents an instantaneous slip between different axles of the motor vehicle or between different wheels of an axle;

forming an absolute value of the slip value which corresponds to the amount of the slip value;

summing the absolute value or a substitute value derived herefrom to a last-formed slip sum value to form an instantaneous slip sum value;

comparing the instantaneous slip sum value with a slip sum threshold value: and generating a control signal for actuating the coupling if the instantaneous slip sum value reaches or exceeds the slip sum threshold value.

A detection and preparation of slip values, an evaluation of the slip values and, optionally, a generation of control signals and a corresponding actuation of the respective coupling take place in repeating calculation loops in the method. These steps can be carried out for a single coupling or for a plurality of couplings of a powertrain in a respective calculation loop.

In a respective calculation loop of the method, at least one slip value is determined which represents an instantaneous slip between different axles of the motor vehicle (for example when the coupling is associated with an inter-axle differential gear) or an instantaneous slip between different wheels of an axle (for example a transverse differential lock). The respective slip value can, for example, have the dimension of an angle, of a radian measure, of a speed of rotation, of a path distance or of a speed. In this respect, the respective slip value is a difference between two signals which are generated at different positions of the powertrain and which represent a respective rotational position. They can, for example, be the signals of the wheel speed sensors anyway present in an ABS system or ESP system.

In accordance with the invention, an absolute value which corresponds to the amount of the determined slip value and which preferably has a positive sign is formed using the respective slip value. In other words, negative slip values are converted into positive values. It is thus generally possible subsequently to make calculations using positive values, with the exception of the still to be explained negative substitute values, whereby the calculation is simplified. In an equivalent manner, the named absolute value, i.e. the amount of the determined slip value, could naturally also be provided with a negative sign so that it would generally be possible subsequently to make calculations using negative values, whereby the calculations would likewise be simplified. For reasons of simplicity, it is, however, assumed in the following explanation of the invention that the named absolute value should have a positive sign. This means that on the equivalent use of absolute values with a negative sign, the subsequently named signs and threshold value comparisons would have to be inverted.

The absolute value formed in the respective calculation loop, or a substitute value derived herefrom (as will be explained in the following), is summed to a last-formed slip sum value to form a new so-called instantaneous slip sum value. In other words, the respective absolute value or substitute value is added to that slip sum value which was formed as the instantaneous slip sum value in a preceding calculation loop. This mathematical operation is generally a sum, with the named absolute values generally always being positive values, and the instantaneous slip sum value accordingly generally increases. In the case of a negative substitute value, this sum formation ultimately corresponds, however, to a difference, i.e. in this case the instantaneous slip sum value is reduced with respect to the last-formed value.

To the extent that the named summing takes place in a quasi-continuous or continuous manner, the summing ultimately corresponds to a time integration. Such an integration is also covered by the invention, with reference always only being made to a summing in the following for reasons of simplicity.

After the summing, the instantaneous slip sum value hereby formed is compared with a slip sum threshold value. It can be a predefined constant. The slip sum threshold value is, preferably, however, selected in dependence on further parameters, for example in dependence on the amount of a slip gradient, on the sign of a slip gradient, on the travel speed and/or on an instantaneous torque demand. Such additional parameters can be taken into account, for example, in that a presetting value for the slip sum threshold value is multiplied by a variable weighting factor.

If the named comparison produces the result that the instantaneous slip sum value reaches or exceeds the slip sum threshold value, a control signal is generated to actuate the coupling, in particular to close the coupling. The control signal does not, however, have to result directly in the actuation of the coupling, but still further conditions can rather also be taken into account for this purpose, for example a speed of rotation difference at the coupling, the travel speed, a detected transverse acceleration value, a detected gradient value, a state parameter of the actuator of the coupling (e.g. pressure) or the like.

An important feature of the invention is thus that generally the absolute values, that is only the (positive) amount of the respective slip value, are used for the summing of the determined slip values. An advantageous reduction in the calculation times, in the required calculation capacity and in the memory requirement is hereby achieved. Since work is generally carried out with positive values, apart from the negative substitute values still to be explained in the following, after the forming of the absolute values the required mathematical operations are simplified. A parallel evaluation of positive and negative slip values with a correspondingly increased calculation time and double the memory requirements, such as is known from the document EP 1 468 860 B1, is dispensed with. The required mathematical operations can be carried out very fast so that it is possible to respond to changed conditions in real time or within a few milliseconds to control the respective coupling accordingly as fast as possible. Not only an ideal traction is hereby ensured since the speed of rotation difference, for example between a slipping wheel and a not yet slipping wheel, is not increased or is only slightly increased. It is also prevented that the respective coupling can no longer be closed at all due to a speed of rotation difference which has become too high in the meantime. Furthermore, a calculation time which is as short as possible contributes to a saving of the components of the powertrain, in particular when a coupling operative in form-fitting manner is closed on an already arising speed of rotation difference.

Furthermore, slip oscillations which take place around the zero point can be taken into account without any special additional measures. A slip oscillation is present when the sign of the determined slip values changes several times within a limited time window, i.e. when a repeated change occurs between leading slip and trailing slip. Such slip oscillations can, for example, result from so-called "stick-slip effects" at the tires or occur on driving over so-called washboard roads. Such slip oscillations are promoted by a light construction manner in which the powertrain has a comparatively small torsion stiffness, in particular in combination with long torque connections from the drive unit to the wheels and with high gear ratios and a plurality of gear stages, as is typically the case in the powertrain of an off-road vehicle.

An automatic taking into account of slip oscillations is achieved in the control method in accordance with the invention in that both the positive slip values and the negative slip values contribute to an increase in the instantaneous slip sum value by the taking into account of their amounts (in the form of the named absolute values). The occurrence of a slip oscillation thus inherently results in a continuous increase in the slip sum value, with the increase being the faster, the greater the amplitude of the oscillation is. The slip oscillation results in the generating of a control signal after reaching the slip sum threshold value. It is irrelevant which side of the coupling rotates faster than the other in the method in accordance with the invention due to the forming and evaluation of the absolute values. On a summing of the slip value using signs, in contrast, the amplitude of the slip oscillation would not be taken into account, but the formed slip sum value could rather only reach the average value of the slip oscillation. This would result in no control of the coupling or only a delayed control of the coupling.

In addition to the explained inherent taking into account of slip oscillations, a filtering in accordance with different manners of slip oscillations and a corresponding taking into account by application of weighting factors may also be provided, as will be explained in the following.

As relates to the forming and taking account of absolute values of the slip values, the initially named document EP 1 468 860 B1 admittedly mentions the forming of the absolute value of an existing slip speed. This absolute value, however, only serves for the selection of one of a plurality of couplings which should be controlled with priority. The absolute value is here therefore not summed to form a slip sum value, but this is rather done in the document EP 1 468 860 B1 by summing the slip speeds having signs.

It must be noted in another respect that the steps shown above of the control method in accordance with the invention naturally only represent the basic procedure. In addition, further evaluations can be carried out and further dependencies can be taken into account such as is already partly known from the prior art. Additional signals, for example a steering angle, can in particular be taken into account for the determination of the slip values. The threshold values and/or filter variables used in the method in accordance with the invention can be calculated or modified using the available input signals.

The control process in accordance with the invention can be used in different configurations of a powertrain of a motor vehicle, for example for a coupling of a transfer case operative in the longitudinal direction which distributes the driving torque to different axles of the motor vehicle (permanently or selectively) or for a coupling of a differential gear operative in the transverse direction which distributes the driving torque to the wheels of a respective axle or for a coupling of a selectable wheel drive. The motor vehicle can have two or more axles and accordingly a plurality of couplings can be provided in the powertrain which are controlled in accordance with the method in accordance with the invention, in particular in a configuration as a permanent all-wheel drive or as a selectable all-wheel drive or in a configuration having at least one selectable axle or having at least one selectable wheel drive.

The invention further relates to a powertrain of a motor vehicle having at least one coupling, in particular at least one coupling operative in a formfitting manner of a differential lock of an off-road vehicle, and having a control device which is designed to carry out the method explained above.

Advantageous embodiments of the invention are described in the following.

The respective absolute value of the determined slip value (or a substitute value derived herefrom) is summed to the slip sum value formed in a preceding calculation loop in the mutually following calculation loops during the control method. On a first-time carrying out of the step of summing, the absolute value or substitute value is preferably summed to a predefined starting value.

Provided that slip oscillations occur in the powertrain, they are inherently taken into account—as explained above—due to the forming and summing of absolute values of the slip values. However, a check can be made by additional evaluation of the slip values whether a slip oscillation is actually present, with the last-formed slip sum value or the instantaneous slip sum value being modified if this is the case.

This check can in particular take place in or after the named step of determining slip values. The modifying of the slip sum value can in particular take place before or in the named step of summing. The response to a slip oscillation can be improved even further by a modifying of the last-formed slip sum value which is then used as a basis for the named step of summing in the instantaneous calculation loop. This can alternatively also be achieved in that the slip sum threshold value is modified before the named step of comparing the instantaneous slip sum value.

A filtering can in particular take place based on whether the slip oscillation results from floor unevenness or other external disturbing influences or whether, in contrast, the slip oscillation is caused by elasticities of the powertrain. Furthermore, too soon or too frequent a control of the coupling can be prevented on the basis of an additional test for presence of a slip oscillation, namely when the slip oscillation only occurs for a short time period, but with a large amplitude.

To modify the respective slip sum value in this sense, the instantaneous slip sum value or the last-formed slip sum value can, for example, be multiplied by a weighting factor which has a value between zero and one. To modify the slip sum threshold value, the slip sum threshold value can be multiplied by a positive weighting factor larger than zero. In both cases, the respective weighting factor can be a predefined constant or the weighting factor is dependent on further parameters, for example on the oscillation amplitude, on the amount of a slip gradient, on the sign of a slip gradient, on the travel speed or on an instantaneous torque demand.

A monitoring is preferably carried out for the named check of whether a slip oscillation is present whether the determined slip values change sign at least once (preferably a plurality of times) within a predetermined time period or within a predefined number of calculation loops, i.e. in accordance with a predefined minimum number of sign changes. A check is in other words made whether a single or multiple change between leading slip and trailing slip takes place within a predefined time window. In this respect, a positive response threshold value and a negative response threshold value are preferably taken into account, i.e. a valid sign change is only present when the determined slip value falls below a negative response threshold value starting from a leading slip or exceeds a positive response threshold value starting from a trailing slip. It must be noted that such a check for the presence of a slip oscillation is carried out using the positive and negative slip values, i.e. not using the named absolute values.

In accordance with an embodiment, for the check whether a slip oscillation is present, a slip oscillation monitored value can, for example, always be increased by a predefined value if a sign change of the determined slip values is found, with the slip oscillation monitored value, however, being reduced by a predefined value if a predefined time interval or a predefined number of calculation loops has elapsed so that the slip oscillation monitored value is hereby also reduced again. In this embodiment, the presence of a slip oscillation is determined if the slip oscillation monitored value reaches or exceeds a slip oscillation threshold value. The slip oscillation monitored value can, for example, be set to the value zero at the start of such a monitoring. The slip oscillation monitored value can, for example, also be set back to the value zero when no sign change is determined after the elapse of a predefined time interval or of a predefined number of calculation loops. The named slip oscillation threshold value can be a constant or this value is dependent on further parameters, for example on the amount of a slip gradient, on the sign of a slip gradient, on the travel speed or on an instantaneous torque demand.

A filtering in the sense of the taking into account of a response threshold can generally be carried out for the determined slip values. This is possible with a particularly small effort if the filtering takes place using the absolute values since then always only values with a positive sign have to be taken into account.

In accordance with a preferred embodiment, the absolute value of the respective slip value (or a substitute value previously derived herefrom) is therefore compared with a slip response threshold value, with the absolute value (or the substitute value already previously derived) being substituted by a substitute value which has the value zero or a negative value before or in the step of summing if the absolute value (or the already previously derived substitute value is smaller than the slip response threshold value. In other words, slip values low in magnitude are set to the value zero and are thus ignored for the forming of the instantaneous slip sum value or slip values low in magnitude are set to a negative substitute value. The reduction of the slip sum value explained in the following can be realized in a particularly simple manner by the last-named variant.

If the absolute value (or the already previously derived substitute value) is larger than the slip response threshold value, the absolute value (or the already previously derived substitute value) is preferably substituted by a substitute value which corresponds to a difference between the absolute value (or the already previously derived substitute value) and the slip response threshold value. The reduction of the slip sum value explained in the following can also hereby be realized in a particularly simple manner.

The named slip response threshold value can be a constant or this threshold value is dependent on further parameters, for example on the amount of a slip gradient, on the sign of a slip gradient, on the travel speed or on an instantaneous torque demand.

In accordance with a preferred embodiment, a regulated reduction of the slip sum value takes place in the calculation loops. This can take place in generally every calculation loop or only when the absolute value of the slip value formed in the respective calculation loop falls below a predefined threshold value. In both cases, the instantaneous slip sum value is reduced by an artificial slip value, preferably instead of the summing of the absolute value to the last-formed slip sum value. This can take place in a particularly simple manner in that the artificial slip value is added to the last-formed slip sum value as a negative substitute value so that ultimately a difference forming takes place.

It is prevented by such a regulated reduction of the slip sum value that the slip sum value increases constantly, even if no slip or only a slight slip is present. Instead, a reduction of the last-formed slip sum value is possible which can, on the one hand, be flexibly adapted to the instantaneous driving situation and, on the other hand, can be reproduced easily. An unwanted so-called gear hunting, i.e. multiple opening and closing of the coupling in a short time period, can in particular be prevented with an only slowly reducing slip. A faster reduction of the instantaneous slip sum value can namely also be achieved by the use of predefined negative substitute values when the actual slip values are relatively small in magnitude.

The impression of a predictable, reliable coupling shift also results better for the driver of the motor vehicle due to a regulated reduction of the slip sum value. It can in particular be prevented by the use of predefined negative substitute values that the control of the coupling excessively depends on the history (which may already be far in the past) of the earlier slip values and is hereby difficult to predict for the driver. In known control processes, in contrast, the situation can, for example, occur that a coupling is controlled unexpectedly early or frequently since a high slip sum value is also achieved when the sign of the individual slip values is positive over a longer time even though the individual slip values are very low in magnitude and are thus actually negligible. If, in contrast, the slip sum value is reduced in such a situation, too early or too frequent a control of the coupling can be prevented and the drive does not have the impression of a random coupling shift.

It is possible with respect to such a reduction of the slip sum value that the absolute value of the slip value or a substitute value already derived herefrom is generally reduced by a slip reducing value before or in the step of summing to form a positive or negative substitute value on a case by case basis. In other words, the named slip reducing value is selected such that some of the substitute values formed in the different calculation loops are positive and the other substitute values are negative.

Alternatively to this, it is also possible with respect to the explained reduction of the slip sum value that the absolute value of the slip value or a substitute value derived herefrom is compared with a slip reducing threshold value in the respective calculation loop, with the absolute value or the substitute value already derived herefrom being substituted by a substitute value having a negative sign before or in the step of summing if the absolute value or the substitute value already derived herefrom falls below the slip reducing threshold value. If the absolute value or the substitute value already derived herefrom exceeds the slip reducing threshold value, the absolute value or the substitute value already derived herefrom is optionally substituted by a substitute value having a positive sign and corresponding to a difference between the absolute value (or the already previously derived substitute value) and the slip reducing threshold value. The named slip reducing threshold value can be a predefined constant. The slip reducing threshold value is, however, preferably dependent on further parameters such as on the amount of a slip gradient, on the sign of a slip gradient, on the travel speed or on an instantaneous torque demand. The slip reducing threshold value can in particular also be selected in dependence on the presence of slip oscillations. The same applies accordingly to the negative substitute value, i.e. it can also be a constant or can be selected in dependence on different parameters such as on the travel speed or on an instantaneous torque demand.

Provided that both a filtering by means of the named slip response threshold value and a reduction of the slip sum value takes place using the named slip reducing threshold value, it is preferred if first the filtering is carried out and then the reduction. In other words, the absolute value of the slip value is first compared with a slip response threshold value to form a substitute value in dependence on the result of this comparison. This substitute value is then compared with a slip reducing threshold value in order optionally to substitute the substitute value by another substitute value having a negative sign in dependence on the result of this comparison. The slip response threshold value and the slip reducing threshold value can be different in this respect and can in particular also depend on different parameters.

It is preferred in connection with the explained reduction of the slip sum value if the instantaneous slip sum value is set to the value of the slip sum threshold value in a respective calculation loop if the instantaneous slip sum value exceeds the slip sum threshold value, i.e. an upper limit is set. Alternatively or additionally, a check can also be made in a respective calculation loop whether the instantaneous slip sum value has a negative sign (i.e. is smaller than zero), with the instantaneous slip sum value being set to the value zero if this is the case, i.e. a lower limit is set. It is thus achieved even better that the slip sum value adopts starting values for the later summing of the absolute values or substitute values which can also be reproduced after a longer time so that the control behavior of the coupling is better predictable for the driver and does not depend, for instance, on a history which is excessively far in the past.

Alternatively or in addition to the already explained filtering of the absolute values using a slip response threshold time, a filtering can take place in line with requirements in dependence on different parameters which characterize the instantaneous driving situation in different manners. A substitute value for the absolute value (or for a substitute value already previously derived herefrom) can be formed as the result of such a filtering, in particular in that the absolute value (or the substitute value already derived herefrom) is multiplied by a weighting factor. If a plurality of different filtering procedures are carried out, a plurality of weighting factors resulting herefrom can be multiplied by one another or, instead, a prioritization takes place, i.e. the most relevant of the determined weighting factors is selected and multiplied by the absolute value or substitute value (e.g. the highest weighting factor or the weighting factor representing a slip oscillation).

A slip increase can in particular be taken into account in this manner. It is preferred for this purpose if a slip increase value is formed which represents a time gradient of a slip increase, with the absolute value or a substitute value already derived herefrom being substituted before or in the step of summing with a substitute value which corresponds to a product of the absolute value or the substitute value already derived herefrom, on the one hand, and of a slip increase weighting factor, on the other hand, which depends on the formed slip increase value. It is thus possible to allow the slip sum value to increase particularly fast on the presence of a high slip increase in order to reach the slip sum threshold value at an early point and thus to trigger a control of the coupling.

To form the named slip increase value, a difference can, for example, be formed between the absolute value formed in the instantaneous calculation loop and the absolute value formed in a preceding calculation loop. This difference is preferably divided by a value which represents the time duration between the preceding calculation loop and the instantaneous calculation loop. It can furthermore optionally be taken into account whether the underlying slip values have the same sign, with then a slip increase only being adopted when identity of signs is present.

The named slip increase weighting factor is preferably set to a positive value larger than one if the formed slip increase value represents a positive time gradient of a slip increase.

It is furthermore preferred that the slip increase weighting factor is selected the larger, the larger the formed slip increase value is. It can hereby be achieved that the coupling is closed rapidly on a fast increase of the slip before a still reliable speed of rotation difference at the coupling is exceeded.

The slip increase weighting factor can be selected as variable, for example in dependence on the travel speed or on an instantaneous torque demand.

If, in contrast, the formed slip increase value represents a slip decrease value, i.e. if the slip increase value represents a negative time gradient of the slip increase, the slip increase weighting factor is preferably set to the value one. This means that the multiplication by the absolute value or substitute value remains without effect.

Alternatively or additionally to such a taking into account of a slip increase, a check can be made whether a slip oscillation is present. In a similar manner as already explained for the modifying of the slip sum value in dependence on the presence of a slip oscillation, the respective absolute value or substitute value can therefore also be modified to take the special circumstances of a slip oscillation into account. This in particular allows a distinction between real oscillations caused by slip (e.g. "stick-slip effects" or traveling over washboard roads, such as already explained) and seemingly occurring oscillations (which only emanate, for example, from the lugs of all-terrain tires). It is preferred in this respect if a check is made whether a slip oscillation is present, with the absolute value or a substitute value already derived herefrom being substituted if this is the case before or in the step of summing with a substitute value which corresponds to a product of the absolute value or the substitute value already derived herefrom, on the one hand, and of a slip oscillation weighting factor, on the other hand.

A monitoring can in particular be made for the check of whether a slip oscillation is present whether the determined slip values change sign at least once (preferably a multiple of times) within a predefined time period or within a predefined number of calculation loops, as was already explained in connection with a modifying of the slip sum value. A positive response threshold value and a negative response threshold value can in particular be taken into account in this respect.

The named slip oscillation weighting factor is preferably set to a positive value unequal to zero (i.e. larger than zero or smaller than zero) if it is found that a slip oscillation is present. If, in contrast, it is determined that no slip oscillation is present, the slip oscillation weighting factor is preferably set to the value one, i.e. the multiplication by the absolute value or substitute value then remains without effect. The slip oscillation weighting factor can depend on various parameters, for example on the travel speed or on the instantaneous torque demand. Provision can in particular be made that, when a slip oscillation is detected, a distinction is also made based on the kind of slip oscillation (real oscillation or seemingly occurring slip oscillation, as explained above), with a slip oscillation weighting factor larger than one or smaller than one being selected in dependence on this.

As relates to the actuation of the coupling, it is thus preferred in the case of a coupling operative in form-fitting manner of a differential lock that the coupling is actuated in dependence on the generated control signal for a predefined minimum holding duration in the closing direction. The coupling can be biased in the opening direction for this purpose, with the coupling opening automatically as soon as the coupling is no longer actuated in the closing direction and no torque or only a small torque is transferred via the coupling. The named minimum holding duration can be realized in that the control signal itself is generated for the named minimum holding duration or in that the actuator of the coupling is operative for the named minimum holding duration. The control signal generated in accordance with the method of the invention, however, does not directly have to result in an actuation of the coupling, but still further conditions can rather be taken into account for this purpose, for example a sufficiently small speed of rotation difference at the two parts of the coupling, the travel speed, an instantaneous transverse acceleration value, an instantaneous gradient value of the vehicle, a state parameter of the actuator (e.g. pressure) or the like.

An active opening of the coupling can also be provided alternatively to such an automatic opening of the coupling. It is preferred for this purpose that the instantaneous slip sum value is also compared with a further lower slip sum threshold value, with a control signal being generated for opening the coupling if the instantaneous slip sum value falls below the further slip sum threshold value.

The control method in accordance with the invention has been explained above for a single coupling. The control method is, however, used particularly advantageously in the powertrain of a motor vehicle having a plurality of couplings, in particular having a plurality of couplings operative in form-fitting manner of a respective differential lock, with the above-explained method steps being carried out for some or all of the plurality of couplings. In this respect, at least some of the plurality of couplings can be controlled substantially independently of one another, with a high flexibility being present with respect to the fixing of that coupling which should be shifted first due to the instantaneous traction requirements. A fixedly preset, purely hierarchical shifting order is thus avoided such as is known from the initially named document EP 0 644 077 B1.

It is preferred for this purpose if different threshold values, different weighting factors and/or different minimum holding durations are used for the control of the plurality of couplings. A variable order of the actuation of the couplings in line with requirements can thus be set.

In an off-road vehicle, the named plurality of couplings preferably includes at least one coupling of an inter-axle differential lock and at least two couplings of a respective axle different lock (front axle differential lock and rear axle differential lock). In accordance with an advantageous embodiment, the above-explained control method is only carried out for the couplings of the axle differential locks, whereas the control method for the coupling of the inter-axle differential lock is modified in accordance with a maximum value observation. It can hereby be achieved that the inter-axle differential lock is usually closed by the axle differential locks, which is basically sensible on the basis of the driving dynamics.

For this purpose in particular the following steps can be carried out in the respective calculation loop for the coupling of the inter-axle differential lock:

determining at least one slip value which represents an instantaneous slip between different axles of the motor vehicle;

forming an absolute value of the slip value which corresponds to the amount of the slip value;

selecting a maximum value from the absolute values formed for a group of couplings in the respective calculation loop or from the substitute values derived herefrom;

summing the maximum value or a substitute value derived herefrom to a last-formed maximum slip sum value to form an instantaneous maximum slip sum value for the coupling of the inter-axle differential lock:

comparing the instantaneous maximum slip sum value with a maximum slip sum threshold value: and generating a control signal for actuating the coupling of the interaxle differential lock if the instantaneous maximum slip sum value reaches or exceeds the maximum slip sum threshold value.

A substantial difference from the control method for the couplings of the axle differential locks is in this respect that a so-called maximum value is summed to a last-formed so-called maximum slip sum value, with the instantaneous maximum slip sum value hereby formed being compared with a so-called maximum slip sum threshold value. The value largest in magnitude which has been formed for a group of couplings as the respective absolute value or as the substitute value derived herefrom is used as the maximum value for this purpose. This group of couplings can include only some or all of the plurality of couplings of the powertrain, in particular all couplings of the axle differential locks as well as also the related coupling of the observed inter-axle differential lock.

In other words, the respective absolute value or substitute value is formed for these couplings and the largest value is selected from these absolute values or substitute values (as the so-called maximum value). A maximum slip sum value which is compared with the maximum slip sum threshold value is then formed using the maximum values selected for the mutually following calculation loops. This ultimately results in a control of the coupling of the inter-axle differential lock if a sufficiently large slip is detected at any coupling, that is, for example, also at the couplings of the front axle differential lock and rear axle differential lock, even if no slip or no particularly large slip is determined between the axles.

The explained selection and taking into account of a respective maximum value for the coupling of the observed inter-axle differential lock preferably takes place alternatively to the forming and comparing of a slip sum value using the absolute values only of the respective coupling of the observed inter-axle differential lock. In other words, only the explained alternative control method (taking account of maximum values) is used for this coupling.

If the powertrain has a plurality of inter-axle differential locks, the explained alternative control method (taking into account of maximum values) can be carried out for the couplings of all inter-axle differential locks. The explained alternative control method is, however, preferably only carried out for one of the plurality of inter-axle differential locks. In particular for a or the rear inter-axle differential lock.

The named selection of the maximum value preferably only takes place in the respective calculation loop after a check has been made whether the absolute values formed in the respective calculation loop for the different couplings should be substituted by a respective substitute value and, if this is the case, after the respective absolute value has been substituted by the respective substitute value. In other words, the maximum value is only selected after the filtering processes and threshold value comparisons individually provided for the different couplings have already been carried out. The respective absolute value can in particular first be compared with a slip response threshold value for each of the couplings. Furthermore, a check can be made and it can be taken into account before the selection of the maximum value for each coupling whether a slip oscillation or a slip increase is present (multiplication by a corresponding weighting factor).

The maximum value selected for the coupling of the observed inter-axle differential lock can be further processed in a corresponding manner, as has already been explained above for the absolute values of the general control method, in particular by substituting the selected maximum value with a suitable substitute value. For example, the selected maximum value can also be compared with a slip response threshold value in order optionally to substitute the selected maximum value with a substitute value which is smaller than the selected substitute value or has the value zero. Furthermore, the selected maximum value can be compared with a slip reducing threshold value and can optionally be substituted by a substitute value having a negative sign.

The formed instantaneous maximum slip sum value can also be modified in a corresponding manner, as explained above for the slip sum value of the general control method. For example, the instantaneous maximum slip sum value can be limited to the value of the maximum slip sum threshold value (as the upper limit) or to the value zero (as the lower limit).

The control method in accordance with the invention allows the control of a plurality of couplings in a powertrain, as explained, in a flexibly fixable order. A preferred actuation of a coupling of an inter-axle differential lock can be preset by the selection and taking into account of maximum values. If a specific shifting sequence for some or all of the plurality of couplings should always necessarily be observed (for example for safety aspects), alternatively or additionally to the explained technical control measures, a mechanical, hydraulic, pneumatic or electric coupling can be provided between the respective couplings or their actuation system.

DRAWINGS

The invention will be explained in the following only by way of example with reference to the drawings. There are shown:

FIG. 2 shows a time diagram which represents the development of the control of an individual coupling by way of example; and FIG. 3 shows a time diagram which represents the development of a control of a plurality of couplings by way of example.

DETAILED DESCRIPTION

Figure 1:
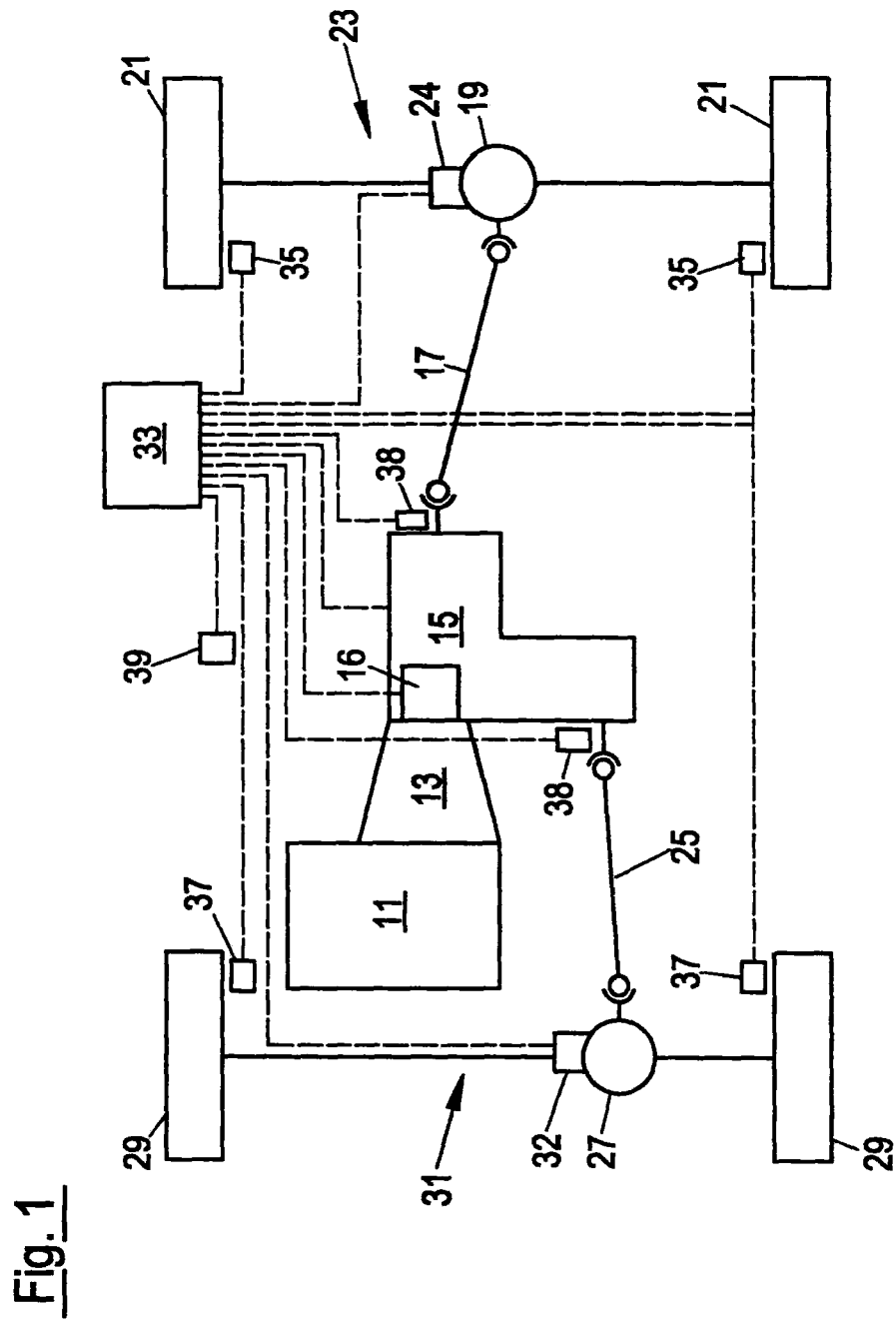
FIG. 1 shows a schematic representation of a powertrain of a motor vehicle.

FIG. 1 schematically shows a powertrain of a two-axle all-terrain motor vehicle having permanent all-wheel drive (4×4). The driving torque generated by an internal combustion engine 11 is supplied via a main transmission 13 (manual shift transmission or automatic transmission) to a two-axle differential gear 15. The two-axle differential gear 15 includes a coupling 16 in order selectively to lock the two-axle differential gear 15. A first output of the inter-axle differential gear 15 is coupled to a rear axle differential gear 19 via a Cardan shaft 17. The wheels 21 of the rear axle 23 are driven via the differential gear 19. A coupling 24 is associated with the rear axle differential gear 19 in order selectively to lock the rear axle differential gear 19. A second output of the inter-axle differential gear 15 is coupled to a front axle differential gear 27 via a Cardan shaft 25. Some of the driving torque is transferred to the wheels 29 of the front axle 31 via the differential gear 27. A coupling 32 is associated with the front axle differential gear 27 in order selectively to lock the rear axle differential gear 27. The couplings 16, 24, 32 are clutches operative in form-fitting manner or friction-engaging manner.

Furthermore, a control unit 33 is shown in FIG. 1. It is connected to wheel speed sensors 35, 37 which are associated with the wheels 21 of the rear axle 23 or with the wheels 29 of the front axle 31. The control device 33 is furthermore connected to shaft speed sensors 38 for generating signals which represent the respective speed of the two outputs of the inter-axle differential gear 15, i.e. of the Cardan shaft 17 and of the Cardan shaft 25. The control device 33 is connected to further sensors 39, for example to a steering angle sensor, to a tilt sensor, to a yaw rate sensor and the like. The control device 33 generates control signals in dependence on the signals of the sensors 25, 37, 38, 39 to actuate the couplings 16, 24, 32 in order hereby to lock one or more of the differential gears 15, 19, 27. The shaft speed sensors 38 are not necessarily required to form shaft speed signals for the two outputs 17, 25 of the inter-axle differential gear 15. Instead, these shaft speed signals can also be derived from the signals of the wheel speed sensors 35, 37 of the respective axle 23, 31.

The control device 33 can also include, instead of the shown central arrangement, three separate units which are each associated with one of the couplings 16, 24, 32 and are in signal communication with one another in a suitable manner.

Differing from the representation in accordance with FIG. 1, the motor vehicle can also have more than two axles, for example three axles, of which two axles (6×4) or three axles (6×6) are driven. In the last-named case, two lockable inter-axle differential gears and three lockable axle differential gears would be present.

FIG. 2 shows a time diagram for illustrating an exemplary control method for one of the couplings 16, 24, 32 of the powertrain in accordance with FIG. 1. The diagrams (a) to (f) in accordance with FIG. 2 show the same time t on the abscissa.

Diagram (a) shows the time development of a slip value SLP of the coupling. If it is the coupling 16 of the inter-axle differential gear 15 in accordance with FIG. 1, the slip value SLP can be determined from a difference of the signals of the two shaft speed sensors 38 at the outputs of the inter-axle differential gear 15 or from the signals of the wheel speed sensors 35, 37, with additional parameters being able to be taken into account and corrections being able to be carried out (e.g. taking into account of a steering angle signal). If it is the coupling 24 of the rear axle differential gear 19 in accordance with FIG. 1, the slip value can be determined from the signals of the two wheel speed sensors 35 of the rear axle 23, with additional parameters also being able to be taken into account and corrections being able to be made here. The slip value SLP shown in diagram (a) in accordance with FIG. 2 represents an instantaneous leading slip (passive values) and an instantaneous trailing slip (negative values). In addition, a slip response threshold value SLP-LIM is shown in diagram (a) which is entered here both on the positive side and on the negative side, with the positive threshold value and the 5 negative threshold value being of equal magnitude in amount.

During the operation of the control device 33 in accordance with FIG. 1, the determined slip values SLP are constantly further processed and evaluated in repeating calculation loops. With a sufficiently high scanning frequency and clock frequency, the values formed herefrom appear as a constant curve, as shown in FIG. 2.

The determined respective slip value SLP is first converted into an absolute value, i.e. negative slip values are provided with a positive sign. The respective absolute value of the slip value SLP is then compared with the upper slip response threshold value SLP-LIM in accordance with diagram (a) to form a first substitute value ABS. If the respective absolute value is smaller than the upper slip response threshold value SLP-LIM, the first substitute value ABS is set to the value zero. Otherwise the first substitute value ABS receives the value of the absolute value (alternatively, the absolute value could in this case also be reduced by a slip reducing value). It is understood that a reverse procedure could also be followed for the named comparison, i.e. first the (positive or negative) slip value SLP is compared with the upper and lower slip response threshold value SLP-LIM in accordance with diagram (a) in order optionally to set the slip value SLP to the value zero and only then is the absolute value formed.

The thus formed first substitute value ABS is shown in diagram (b), with the first substitute value ABS being shown enlarged along the ordinate with respect to the representation in accordance with diagram (a). It can be recognized that the first substitute value ABS adopts the value zero before the first point in time t1. At the point in time t1, the slip value SLP falls below the lower slip response threshold value SLP-LIM in accordance with diagram (a), i.e. the absolute value of the slip value exceeds the upper slip response threshold value. Accordingly, a jump of the first substitute value ABS to a positive value in accordance with the slip response threshold value SLP-LIM and a subsequent increase and later drop of the first substitute value ABS can be recognized in the diagram (b). At the point in time t2, the slip value SLP in accordance with diagram (a) again falls in magnitude below the slip response threshold value SLP-LIM, which has the meaning for the first substitute value ABS in accordance with diagram (b) that it again adopts the value zero. Such a development of the first substitute value ABS is repeated in the time interval t3 to t4 and again in the time interval t5 to t7.

The first substitute value ABS in accordance with diagram (b) is then reduced by a slip reducing value to form a second substitute value RED which is shown in diagram (c). The named slip reducing value is selected in relation to the slip response threshold value SLP-LIM in accordance with diagram (a) such that the second substitute values RED are positive or negative on a case to case basis. In the embodiment shown here, the named slip reducing value is selected as exactly the same in magnitude as the slip response threshold value SLP-LIM for reasons of simplicity.

In order to arrive at the second substitute value RED in accordance with diagram (c) in a particularly simple manner, the comparison of the respective absolute value with the slip response threshold value SLP-LIM in accordance with diagram (a) could alternatively also be carried out such that the absolute value is substituted by a negative substitute value RED if the absolute value is smaller than the upper slip response threshold value SLP-LIM and such that the absolute value is substituted by a substitute value RED which corresponds to a difference between the absolute value and the slip response threshold value SLP-LIM if the absolute value is larger than the upper slip response threshold value SLPLIM. The intermediate step of forming the first substitute value ABS in accordance with diagram (b) would therefore hereby be dispensed with.

It must be noted at this point that the following procedure could alternatively also be followed: The first substitute value ABS in accordance with diagram (b) could be compared with a slip reducing threshold value ABS-LIM. If the first substitute value ABS is smaller than the slip reducing threshold value ABS-LIM, the first substitute value ABS is substituted by a negative second substitute value RED. Otherwise the second substitute value RED adopts the (positive) value of the first substitute value ABS or the second substitute value RED adopts the difference between the first substitute value ABS and the slip reducing threshold value ABS-LIM. In this alternative procedure, an additional threshold value comparison is admittedly required. However, a better adaptation of the negative second substitute values RED to the respective driving situation is possible, in particular if the slip response threshold value SLP-LIM and the slip reducing threshold value ABS-LIM are selected as different.

Starting from the (positive and negative) slip value SLP in accordance with diagram (a), a check can additionally be made for the presence of a slip oscillation. For this purpose, in accordance with a particularly simple embodiment, a monitoring is carried out whether the determined slip values SLP change sign, with, however, only such slip values SLP being taken into account which exceed a response threshold value in magnitude, in particular the slip response threshold value SLP-LIM anyway taken into account in accordance with diagram (a).

This is illustrated in diagram (d). A switch can first, for example, be set to the value 0 to indicate that no defined slip direction is present. As soon as negative slip values SLP are detected in the time interval t1 to t2 which exceed the slip response threshold value SLP-LIM in magnitude, the switch is set to the value −1, in accordance with a trailing slip. As soon as positive slip values SLP are detected within a predefined number of calculation loops, the switch is set to the value +1, in accordance with a leading slip. A marker CHG is set for each sign change (that is from −1 to +1 or from +1 to −1). This is the case for the first time at a point in time t3 in diagram (d) and later at the point in time t5. If, however, no defined slip (exceeding in magnitude of the slip response threshold value SLP-LIM) is determined within the predefined number of calculation loops, the switch is reset to the value 0 again so that a subsequent determining of a defined slip is not evaluated as a sign change (i.e. no CHG marker).

The above-explained markers CHG for a slip oscillation are used for a modifying of a slip sum value in the embodiment explained in the following. Alternatively or additionally, on the presence of a slip oscillation, the formed substitute value RED can be modified in accordance with diagram (c), for example by multiplication by a weighting factor. Independently of the presence of a slip oscillation, the respective substitute value RED can also be multiplied by a weighting factor which depends on different driving state parameters, for example on a slip increase value.

The second substitute values RED formed in accordance with diagram (c) are summed to an instantaneous slip sum value SUM which is shown in diagram (e) in accordance with FIG. 2. This means that the respective second substitute value RED is summed to a last-formed slip sum value to form the instantaneous slip sum value SUM. It is understood that this instantaneous slip sum value SUM in turn forms the named last-formed slip sum value in the next calculation loop.

Starting from a starting value zero at the point in time t1, this results in an increase in the slip sum value SUM in the time interval t1 to t2. In the time interval t2 to t3 in which the slip values SLP in accordance with diagram (a) lie beneath the slip response threshold value SLP-LIM in magnitude, the slip sum value SUM drops again, namely due to the negative second substitute values RED. At the point in time t3, the marker CHG is set in accordance with diagram (d) and represents a sign change of the slip value SLP and thus a slip oscillation. The marker CHG triggers a reduction in the instantaneous slip sum value SUM. For this purpose, the instantaneous slip sum value SUM is multiplied by a weighting factor which has a positive value smaller than zero. The further summing in the time interval t3 to t4 therefore takes place starting from a much reduced slip sum value SUM. In the time interval t4 to t5, a constant reduction of the instantaneous slip sum value SUM (negative second substitute values RED) takes place again. At the point in time t5, a marker CHG for the presence of a slip oscillation is again set and the instantaneous slip sum value SUM is reduced again. In the following time interval t5 to t6, the instantaneous slip sum value SUM again increases constantly.

At the point in time t6, however, a slip sum threshold value SUM-LIM is reached in accordance with diagram (e). This has two effects. On the one hand, a control signal CTL for the coupling is generated during a predefined minimum holding duration to close the coupling, as is shown in diagram (f). On the other hand, the instantaneous slip sum value SUM is upwardly limited to the slip sum threshold value SUM-LIM, although the second substitute values RED are larger than zero in the time interval t6 to t7. This has the consequence that the instantaneous slip sum value SUM in accordance with diagram (e) drops continuously starting from the slip sum threshold value SUM-LIM (and not, for instance, from a higher value) from the point in time t7 when the second substitute values are negative again. However, as soon as the instantaneous slip sum value SUM reaches the value zero, the instantaneous slip sum value SUM is downwardly limited to the value zero even if negative second substitute values RED are still being formed. In other words, the instantaneous slip sum value SUM can only adopt values between zero and the slip sum threshold value SUM-LIM.

The control method explained with reference to FIG. 2 is characterized in that the required calculations and threshold value comparisons can be carried out particularly simply and fast and thus also make small demands on the associated control device 33 in accordance with FIG. 1 (small calculation capacity, small memory requirement). Apart from the formation of the markers CHG, the evaluation and further processing of the slip values SLP can namely take place only using absolute values, i.e. no calculations for negative slip values and positive slip values have to be carried out separately from one another. A fast generation of the control signal CTL is in particular important when the coupling is a lock for a differential gear 15, 19, 27 since there is otherwise the risk that the respective coupling 16, 24, 28 can no longer be shifted due to the arising speed of rotation difference (in the case of a coupling operative in form-fitting manner) or the thermal stress becomes too great (in the case of a coupling operative in friction-engaging manner).

The back-formation of the slip sum value SUM can be carried out in line with requirements by the use of predefined negative substitute values (negative values of the second substitute value RED) and can in particular be formed in dependence on the instantaneous travel situation. An unwanted gear hunting on an only slowly reducing slip can in particular be avoided since a faster reduction of the instantaneous slip sum value SUM can be achieved by the predefined negative substitute values than would be the case with the use of the actual slip values SLP. Since furthermore a lower limit (zero) and an upper limit (SUM-LIM) is set for the instantaneous slip sum value SUM, defined starting values also result for the forming of the slip sum value SUM so that the generation of the control signal CTL does not depend on a history of the slip values SLP lying excessively far in the past.

FIG. 3 shows a time diagram which illustrates the use of the control method in accordance with FIG. 2 on the three couplings 16, 24, 32 of the 4×4 all-wheel driven off-road vehicle in accordance with FIG. 1. In this respect, a procedure is followed in an analogous manner to the control method in accordance with FIG. 2 for each of the two couplings 24, 32 of both axle differential gears 19, 27, with the setting of markers CHG on the detection of a slip oscillation in accordance with diagram (d) of FIG. 2 being omitted in the embodiment shown. The control method is, however, modified for the coupling 16 of the inter-axle differential gear 15.

The respective slip value SLP1, SLP2 and SLP3 of the coupling 32 of the front axle differential gear 27 or of the coupling 24 of the rear axle differential gear 19 or of the coupling 16 of the inter-axle differential gear 15 is shown in the diagrams (a1), (a2) and (a3) in accordance with FIG. 3. The respective slip response threshold value SLP1-LIM or SLP2-LIM or SLP3-LIM is equally shown in these diagrams. As already explained in connection with FIG. 2, the respective slip value is converted into an absolute value and is compared with the respective slip response threshold value, with the absolute value being substituted by the value zero in the case of a falling below in magnitude. The first substitute values ABS1 and ABS2 and ABS3 respectively resulting for the three couplings 32, 24 and 16 from this are shown together in diagram (b) in accordance with FIG. 3. The first substitute value ABS3 of the coupling 16 of the inter-axle differential gear 15 has the value zero at all times in this embodiment since the underlying slip values SLP3 do not exceed the associated slip response threshold value SLP3-LIM at any point in time, as shown in diagram (a3).

Analogously to the control method in accordance with FIG. 2, the respective first substitute value ABS1, ABS2, ABS3 is reduced by a slip reducing value which corresponds in magnitude to a respective slip reducing threshold value ABS1-LI or ABS2-LI; or ABS3-LIM. The respective slip reducing value or slip reducing threshold value ABS1-LIM, ABS2-LIM, ABS3-LIM is again selected just as large as the respective slip response threshold value SLP1-LIM or SLP2-LIM or SLP3-LIM in accordance with the diagrams (a1) to (a3) here for reasons of simplicity. A respective second substitute value RED1 or RED2 or RED3 is hereby formed, as is shown in diagram (c) in accordance with FIG. 3.

Under dynamic driving aspects, the locking of an inter-axle differential gear frequently achieves the largest effect with respect to traction with the smallest negative influencing of the driving behavior. It is therefore preferred that the coupling 16 of the inter-axle differential gear 15 in accordance with FIG. 1 is closed before the couplings 24, 32 of the two axle differential gears 19, 27 even if no significant speed of rotation difference is yet detected at the inter-axle differential gear 15 (throughgoing value of zero of ABS3 in diagram (b)). In order nevertheless to control the coupling 16 of the inter-axle differential gear 15 in good time, the control device 33 in accordance with FIG. 1 determines a maximum value RED 3' from the three second substitute values RED1, RED2 and RED3 in the respective calculation loop, i.e. the largest second substitute value RED1, RED2 or RED3 formed in the respective calculation loop. This maximum value RED3' is shown in the diagram (c3). In this respect, the maximum value RED3' is set to the negative slip reducing value of the coupling 16 of the inter-axle differential gear 15 if a positive value (exceeding the respective slip response threshold value) is not present for any of the couplings 16, 24, 32 in the respective calculation loop.

Diagram (e) in accordance with FIG. 3 shows, analog to FIG. 2, the slip sum value SUM1 of the coupling 32 of the front axle differential gear 27, the slip sum value SUM2 of the coupling 24 of the rear axle differential gear 19 and the maximum slip sum value SUM3' of the coupling 16 of the inter-axle differential gear 15. The respective instantaneous slip sum value is also formed for the couplings 24, 32 here by summing the respective second substitute value RED1, RED2 to the last-formed slip sum value. However, the maximum value RED3' in accordance with diagram (c3) is used for the forming of the instantaneous maximum slip sum value SUM3' of the coupling 16 of the inter-axle differential gear 15 in accordance with FIG. 1, that is not the second substitute value RED3 in accordance with diagram (c). Furthermore the respective slip sum threshold value SUM1-LIM or SUM2-LIM or SUM3'-LIM is shown in diagram (e).

A check is made in the respective calculation loop for each sum threshold value SUM1, SUM2, SUM3' whether the associated slip sum threshold value SUM1-LIM or SUM2-LIM or SUM3'-LIM is exceeded, with a control signal CTL1 or CTL2 or CTL3' respectively being generated for the respective coupling 32, 24, 16 if this is the case, as is shown in diagram (f). The respective slip sum value SUM1, SUM2, SUM3' is in this respect always downwardly limited to the value zero and upwardly limited to the value of the respective slip sum threshold value SUM1-LIM or SUM2-LIM or SUM3'-LIM.

It must be noted that the different slip sum threshold values SUM1-LIM, SUM2-LIM, SUM3'-LIM are of different amounts. The shift signals CTL1, CTL2, CTL3' also have a different duration. Each of the three couplings 32 or 24 or 16 respectively can hereby be individually controlled, in accordance with the different dynamic driving effects of the locking of the front axle differential gear 27, of the rear axle differential gear 19 and of the inter-axle differential gear 15.

The control of the coupling 16 of the inter-axle differential gear 15 in accordance with FIG. 1 on the basis of a maximum value RED3' which is selected from the modified absolute values of the plurality of couplings 16, 24, 32 of the powertrain for each calculation loop has the particular advantage that the coupling of the inter-axle differential gear 15 is controlled at an early time even if a significant speed of rotation difference and accordingly a significant slip sum value cannot yet be determined at the two output shafts 17, 25 of the inter-axle differential gear 15.

REFERENCE NUMERAL LIST 11 internal combustion engine
13 main transmission
15 inter-axle differential gear
16 coupling
17 Cardan shaft
19 rear axle differential gear
21 wheel
23 rear axle
24 coupling
25 Cardan shaft
27 front axle differential gear
29 wheel
31 front axle
32 coupling
33 control device
35 wheel speed sensor
37 wheel speed sensor
38 shaft speed sensor
39 further sensor
SLP slip value
SLP-LIM slip response threshold value
ABS first substitute value
ABS-LIM slip reducing threshold value
RED second substitute value
CHG marker for slip oscillation
SUM instantaneous slip sum value
SUM-LIM slip sum threshold value
CTL control signal
t time

What is claimed is:

1. A method of controlling at least one coupling in a powertrain of a motor vehicle, the method comprising:
    executing a first calculation loop including
        determining at least one slip value which represents an instantaneous slip between different axles of the motor vehicle or different wheels of an axle,
        determining a first absolute value of the at least one slip value,
        summing the first absolute value or a first substitute value with a last calculated slip sum value to generate an instantaneous slip sum value, wherein the first substitute value is based on the first absolute value,
        comparing the instantaneous slip sum value with a slip sum threshold value, and
        generating a control signal if the instantaneous slip sum value is equal to or exceeds the slip sum threshold value; and
    actuating the at least one coupling of the powertrain based on the control signal.

2. A method in accordance with claim 1, further comprising, prior to executing the first calculation loop, setting the last calculated slip sum value to a predefined starting value.

3. A method in accordance with claim 1, further comprising:
    checking whether a slip oscillation is present; and
    if the slip oscillation is present, modifying the instantaneous slip sum value, the last calculated slip sum value, or the slip sum threshold value.

4. A method in accordance with claim 3, wherein:
    the modifying of the instantaneous slip sum value or the last calculated slip sum value comprises multiplying the instantaneous slip sum value or the last calculated slip sum value by a weighting factor having a value between zero and one; or
    the modifying of the slip sum threshold value comprises multiplying, the slip sum threshold value by a weighting factor larger than one.

5. A method in accordance with claim 3, further comprising:
    determining whether the at least one slip value changes sign within a predefined time period or during execution of a predefined number of calculation loops; and
    if the at least one slip value changes sign, determining that a slip oscillation is present.

6. A method in accordance with claim 5, wherein the determining of whether the at least one slip value changes sign is based on a positive response threshold value and a negative response threshold value.

7. A method in accordance with claim 5, further comprising:
    increasing a slip oscillation value by a predefined value if a sign change of the at least one slip value occurs;
    reducing the slip oscillation value by a predefined value when a predefined time interval or a predefined number of calculation loops has elapsed; and
    detecting presence of a slip oscillation if the slip oscillation value is equal to or exceeds a slip oscillation threshold value.

8. A method in accordance with claim 1, further comprising:
comparing the first absolute value of the at least one slip value to a slip response threshold value; and
substituting the first absolute value with a second substitute value before or while generating the instantaneous slip sum value, wherein the second substitute value is equal to zero or is negative if the first absolute value is smaller than the slip response threshold value.

9. A method in accordance with claim 8, wherein the second substitute value corresponds to a difference between the first absolute value and the slip response threshold value if the first absolute value is larger than the slip response threshold value.

10. A method in accordance with claim 1, further comprising, prior to or while generating the instantaneous slip sum value, reducing the first absolute value of the at least one slip value or a second substitute value by a slip reducing value to generate the first substitute value, wherein the second substitute value is based on the first absolute value.

11. A method in accordance with claim 1, further comprising:
comparing the first absolute value of the at least one slip value or a second substitute value with a slip reducing threshold value, wherein the second substitute value is based on the first absolute value; and
if the first absolute value or the second substitute value is less than the slip reducing threshold value, substituting the first absolute value or the second substitute value by the first substitute value prior to or while generating the instantaneous slip sum value, wherein the first substitute value has a negative sign.

12. A method in accordance with claim 1, further comprising setting the instantaneous slip sum value to equal the slip sum threshold value if the instantaneous slip sum value exceeds the slip sum threshold value.

13. A method in accordance with claim 1, further comprising:
checking whether the instantaneous slip sum value has a negative sign; and
if the instantaneous slip sum value has a negative sign, setting the instantaneous slip sum value to zero.

14. A method in accordance with claim 1, further comprising:
generating a slip increase value that represents a time gradient of of an increase in slip; and
prior to or while generating the instantaneous slip sum value, substituting the first absolute value or the first substitute value by a second substitute value, wherein the second substitute value corresponds to a product of the first absolute value or the first substitute value and a slip increase weighting factor, and wherein the slip increase weighting factor depends on the slip increase value.

15. A method in accordance with claim 14, further comprising:
determining a second absolute value during a second calculation loop;
determining a difference between the first absolute value and the second absolute value; and
determining the slip increase value based on the difference.

16. A method in accordance with claim 15, further comprising:
determining a value based on a duration of time between the first calculation loop and the second calculation loop; and
dividing the difference by the value determined based on the duration of time.

17. A method in accordance with claim 14, further comprising setting the slip increase weighting factor to a greater than one if the slip increase value represents a positive time gradient of an increase in slip.

18. A method in accordance with claim 1, further comprising setting the slip increase weighting factor to one if the slip increase value represents a decrease in slip.

19. A method in accordance with claim 1, further comprising:
checking whether a slip oscillation is present; and
prior to or while generating the instantaneous slip sum value, substituting the absolute value or the first substitute value with a second substitute value, wherein the second substitute value corresponds to a product of the absolute value or the first substitute value and a slip oscillation weighting factor.

20. A method in accordance with claim 19, further comprising:
determining whether the at least one slip value changes sign within a predefined time period or during execution of a predefined number of calculation loops; and
if the at least one slip value changes sign, determining that a slip oscillation is present.

21. A method in accordance with claim 20, further comprising determining whether the at least one slip value changes sign based on a positive response threshold value and a negative response threshold value.

22. A method in accordance with claim 19, further comprising:
setting the slip oscillation weighting factor to a positive value unequal to one if a slip oscillation is present; and
setting the slip oscillation weighting factor to one if no slip oscillation is present.

23. A method in accordance with claim 1, further comprising:
actuating the coupling in a closing direction for a predefined minimum holding duration based on the control signal;
biasing the coupling in an opening direction; and
opening the coupling in response to (i) the coupling no longer being actuated in the closing direction, and (ii) at least one of no torque or less than a predetermined amount of torque is being transferred via the coupling.

24. A method in accordance with claim 1, further comprising:
providing a plurality of couplings in the powertrain of the motor vehicle, wherein the plurality of couplings are operative in a form-fitting manner of a differential lock; and
for each of the plurality of couplings, executing a respective calculation loop comprising
determining at least one slip value of the respective coupling,
determining a first absolute value of the at least one slip value of the respective coupling,
summing the first absolute value of the at least one slip value of the respective coupling or a substitute value for the respective coupling with a last calculated slip sum value for the respective coupling to generate an instantaneous slip sum value or the respective coupling, wherein the substitute value for the respective coupling is based on the first absolute value for the respective coupling, comparing the instantaneous slip sum value for the respective coupling with a slip sum threshold value for the respective coupling, and generating a control signal for actuating the respective coupling if the instantaneous slip sum value for the respective coupling is equal to or exceeds the slip sum threshold value for the respective coupling.

25. A method in accordance with claim 24, further comprising controlling at least some of the plurality of couplings independently of each other.

26. A method in accordance with claim 24, further comprising controlling the plurality of couplings based on at least one of different threshold values, different weighting factors, and different minimum holding durations.

27. A method in accordance with claim 24, further comprising:

providing the plurality of couplings to include at least one coupling of an inter-axle differential lock and at least two couplings of a respective axle differential lock; and for the coupling of the inter-axle differential lock, executing a calculation loop comprising determining a second slip value which represents an instantaneous slip between different axles of the motor vehicle;

generating a second absolute value of the second slip value;

selecting a maximum value from a plurality of absolute values generated for a group of the plurality of couplings or from a plurality of substitute values, wherein the plurality of substitute values is based on the plurality of absolute values;

summing the maximum value or a second substitute value with a last calculated maximum slip sum value for the coupling of the inter-axle differential lock to generate an instantaneous maximum slip sum value for the coupling of the inter-axle differential lock, wherein the second substitute value is based on one of the plurality of absolute values;

comparing the instantaneous maximum slip sum value for the coupling of the inter-axle differential lock with a maximum slip sum threshold value for the coupling of the inter-axle differential lock; and generating a second control signal to actuate the coupling of the inter-axle differential lock if the instantaneous maximum slip sum value for the coupling of the inter-axle differential lock is equal to or exceeds the maximum slip sum threshold value for the coupling of the inter-axle differential lock.

28. A method in accordance with claim 27, further comprising:

checking whether to substitute one of the plurality of absolute values with one of the plurality of substitute values; and then selecting the maximum value for the coupling of the inter-axle differential lock based on whether the one of the plurality of absolute values is substituted with the one of the plurality of substitute values.

29. A powertrain of a motor vehicle comprising:

a coupling; and a control device configured to execute a calculation loop comprising determining at least one slip value, which represents an instantaneous slip between different axles of the motor vehicle or different wheels of an axle, determining an absolute value of the slip value, summing the absolute value or a substitute value to a last calculated slip sum value to generate an instantaneous slip sum value, wherein the substitute value is based on the absolute value, comparing the instantaneous slip sum value with a slip sum threshold, generating a control signal if the instantaneous slip sum value is equal to or exceeds the slip sum threshold value, and actuating the coupling based on the control signal.

\* \* \* \* \*

UNITED STATES PATENT AND TRADEMARK OFFICE
CERTIFICATE OF CORRECTION

| | | |
|---|---|---|
| PATENT NO. | : 8,635,002 B2 | Page 1 of 1 |
| APPLICATION NO. | : 13/405410 | |
| DATED | : January 21, 2014 | |
| INVENTOR(S) | : Christoph Brenner | |

It is certified that error appears in the above-identified patent and that said Letters Patent is hereby corrected as shown below:

Title Page, Column 2, Item (57)
Abstract, Line 10        Delete "value:" and insert --value;--

In the Specifications:
Column 3, Line 20        Delete "value:" and insert --value;--
Column 6, Line 6         Delete "formfitting" and insert --form-fitting--
Column 6, Line 8         Delete "cany" and insert --carry--
Column 7, Line 37        After "value", insert --)--
Column 12, Line 8        Delete "lock:" and insert --lock;--
Column 12, Line 10       Delete "value:" and insert --value;--
Column 14, Line 7        Delete "unit" and insert --device--
Column 15, Line 59       Delete "SLPLIM" and insert --SLP-LIM--
Column 18, Line 34       Delete "ABS1-LI" and insert --ABS1-LIM--
Column 18, Line 34       Delete "ABS2-LI" and insert --ABS2-LIM--

In the Claims:
Column 20, Line 45, Claim 4    Delete "multiplying," and insert --multiplying--
Column 21, Line 47, Claim 14   Before "an", delete "of"
Column 22, Line 4, Claim 17    After "a", insert --value--

Signed and Sealed this
Sixth Day of May, 2014

Michelle K. Lee
*Deputy Director of the United States Patent and Trademark Office*